Patented Dec. 5, 1933

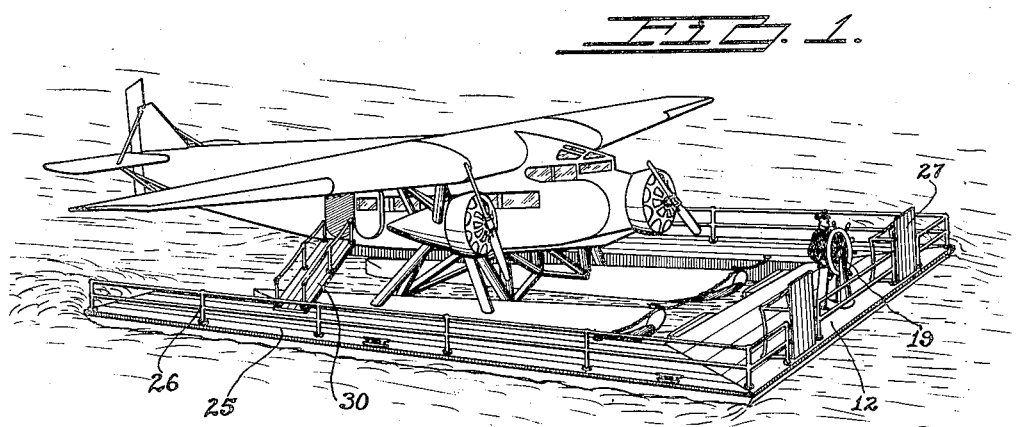
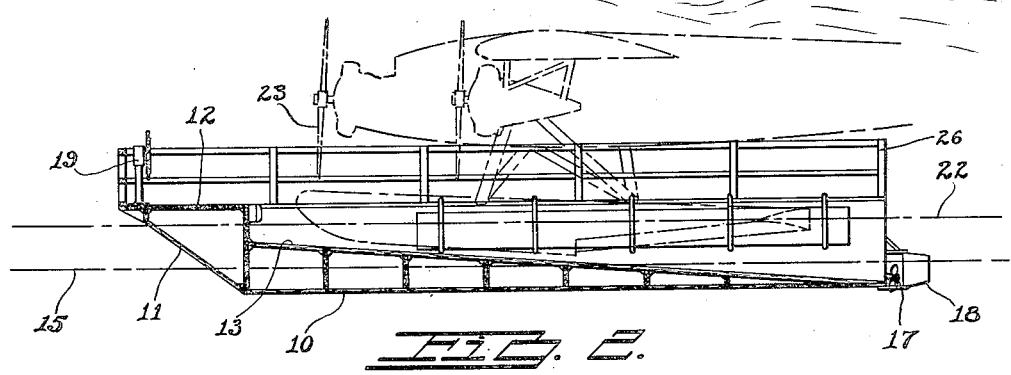
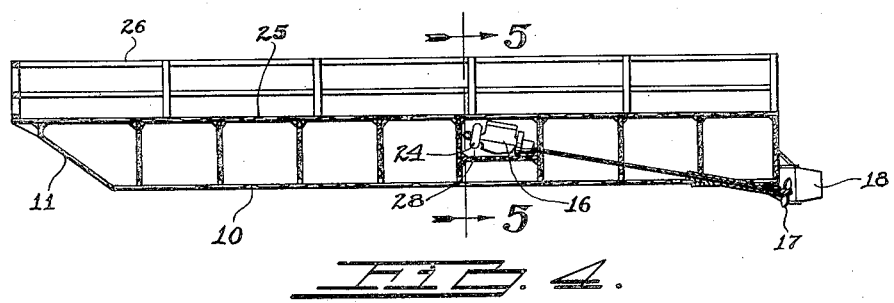

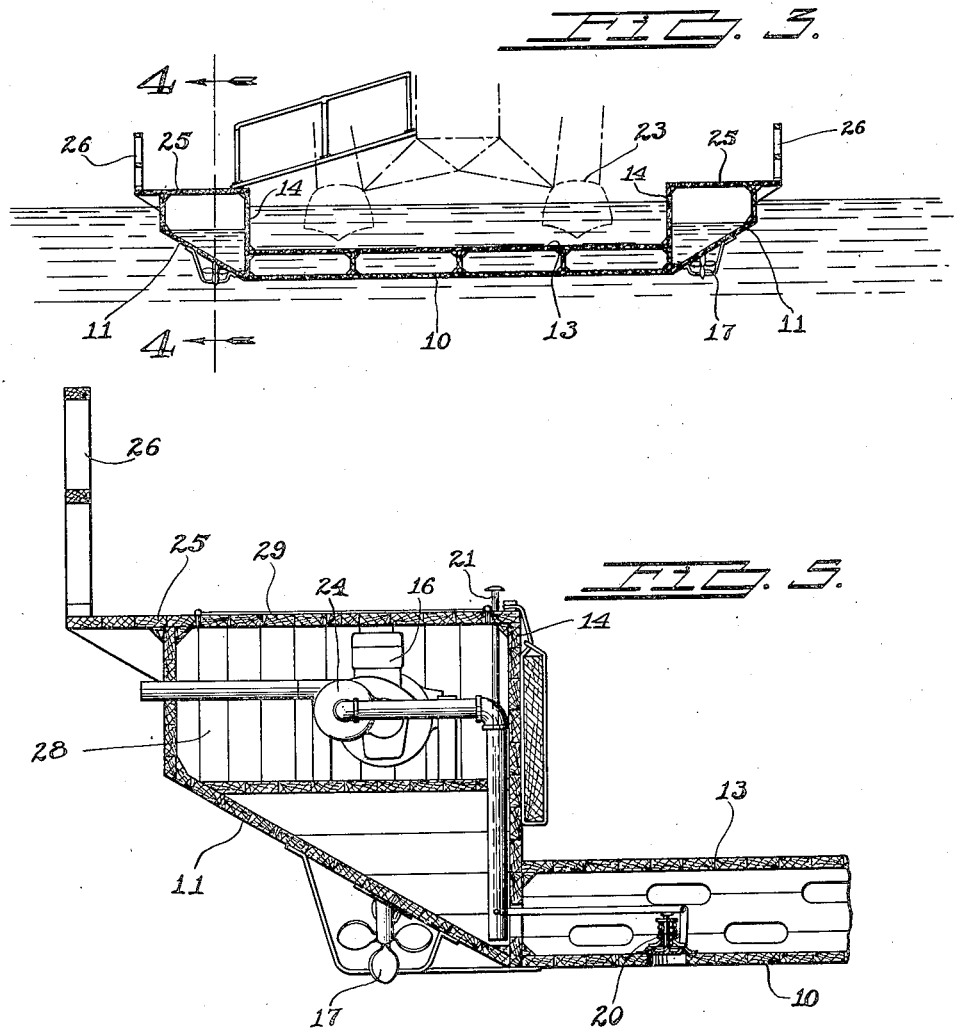

1,937,973

UNITED STATES PATENT OFFICE 1,937,973

SEAPLANE LANDING FLOAT

William B. Mayo, Detroit, Mich., assignor to Ford Motor Company, Dearborn, Mich., a corporation of Delaware Application December 18, 1931
Serial No. 581,889

2 Claims. (Cl. 114—0.5)

The object of my invention is to provide a seaplane landing float for use in connection with a seaplane transportation system.

Where conditions permit, it is highly desirable to lay out an airplane route over water so that seaplanes may be used. The factor of safety is increased by having a body of water available at all times on which the plane may alight if trouble develops. In spite of the safety advantage arising from the use of seaplanes there are certain disadvantages encountered which make their use less desirable from a commercial standpoint, especially where the route is short. The chief disadvantage is that a large percentage of the time available for flying is utilized in taxiing the seaplane between the terminal on the shore and the start of the course. When sight-seeing trips are given about one-half the time is consumed in driving the plane to and from the passenger station on the shore. With my improved landing float this disadvantage is overcome by allowing the plane to remain in the air a much greater proportion of the time thereby increasing the income derived from the plane.

Still a further object of my invention is to provide a seaplane landing float which may readily be converted into a dry dock when desired so the plane can be lifted out of the water to thereby make repairs on the pontoons if desired.

Still a further object of my invention is to provide a novel method of operating an airplane transportation system whereby greater income may be received and better service given to the passengers.

With these and other objects in view my invention consists in the arrangement, construction and combination of the various parts of my improved device, as described in the specification, claimed in my claims, and illustrated in the accompanying drawings, in which:

Figure 1 shows a perspective view of my improved landing float having a seaplane moored therein in position to discharge or take on passengers.

Figure 2 shows a longitudinal central sectional view taken through the float, shown in Figure 1.

Figure 3 shows a transverse sectional view taken through the float, shown in Figure 1.

Figure 4 shows a sectional view, taken on the line 4—4 of Figure 3, and

Figure 5 shows an enlarged sectional view, taken on the line 5—5 of Figure 4.

Referring to the accompanying drawings, I have provided a rectangular shaped float member, the bottom 10 of which is constructed similar to a flat bottomed barge with the front and side walls 11 extending diagonally upward to the deck. This floor may be constructed of metal or planks in any approved manner, it being only essential that a water-tight construction be used. A narrow deck 12 extends across the front of the float and similar decks 25 extend from front to rear along each side. Thus, a well is provided in the center of the float, the purpose of which will subsequently be described. It will be seen from the drawings that a railing 26 extends around the outer edges of the U-shaped deck, the front section of which is provided with a pair of gateways therethrough in which gangplanks 27 are located.

A second deck 13 is constructed across the well between the side decks 25, this deck 13 being spaced a lesser distance from the bottom of the float. As shown in Figure 2, the rear edge of the deck 13 intersects the bottom of the float at its rear edge, while the forward edge of the deck 13 is spaced midway between the bottom 10 and the deck 12 to thereby form an inclined deck between the raised deck 25. Substantially vertical side walls 14 connect the edges of the inclined deck 13 with the raised decks 12 and 25. A water-tight compartment is thus formed between the bottom of the float and the several decks and side walls.

When the above mentioned compartment is empty the float will normally rest on the water, only partially submerged, or to the extent shown by water line 15 in Figure 2.

Inasmuch as the main purpose of this float is to provide a well into which a seaplane may be driven, I have provided means whereby the float may be further submerged so that the deck 13 will be a considerable distance under water, thus allowing a seaplane to taxi up into the well in the float. A valve 20 is disposed in the bottom 10 which is operated by a suitable control 21 on the deck so that by opening the valve 20 water will fill the space between the decks and the bottom 10. Thus, the float may be submerged to the position shown in Figures 2 and 3 from which it will be seen that the water level above the deck 13, as shown by line 22, is sufficient so that a seaplane, as shown by dotted lines 23, may be driven up into the well portion in the center of the float. The weight of the seaplane, of course, rests upon the water in the well and therefore has no effect on the stability of the landing float.

It is essential in the operation of this device to have the float self-propelled. I have thus provided a water-tight compartment 28 in the space between each deck 25, doors 29 in the deck floor giving access to each of these compartments. A motor 16 is mounted in each compartment 28 which motors are directly connected to a pair of propellers 17. A suitable rudder 18 is provided in the rear of each propeller 17 whereby by suitably manipulating the speed of the engines 16 and operating the rudders 18 the float may be maneuvered in any desired direction. A capstan and wheel 19 are provided at the center of the deck 12 whereby the float may be controlled in a manner similar to the ordinary boat control.

As has been previously mentioned, the submerged water line of the float is shown by the line 22 so that when a seaplane is driven up into the space between the decks 25 it will float on the water in the well. If now the float is emptied it will rise very near to the position shown by water line 15 so that the pontoons of the seaplane will rest on the deck 13 above water. Mechanics may thereby make repairs on all portions of the pontoons. The deck 13 being inclined will allow the plane to rest in a normal position. Referring to Figure 5, it will be seen that each of the motors 16 is provided with a pump 24 arranged to draw water from the bottom of the float so that when these pumps are operated the float will be emptied of the water let in by the valve 20.

The normal method of operating my device is to anchor the seaplane in the well of the float. When the passengers are to be taken aboard, they are first admitted to the float and then from the float they are conducted to the cabin of the plane by means of a second gangplank 30. The float is then propelled by the engines 16 out to the course where the plane is to take off. The plane is released from the well, it being free to float out and immediately take off. My float is then propelled back to the dock to take on more passengers for the next trip of the plane. Just shortly before the plane descends the float and passengers leave the dock and navigate out to the course so that when the plane lands it may taxi directly into the well. The passengers in the plane then disembark from the cabin and the passengers waiting on the float enter the cabin and the seaplane immediately takes off. The passengers now on the float are then taken back to the dock and this cycle repeated for each landing of the plane.

Among the many advantages arising from the use of my improved device it will be seen that I have provided a seaplane landing float which is propelled similar to an ordinary boat whereby a seaplane may be transported to and from the course used for taking off.

A further advantage gained by the use of my device is that the seaplane after being conducted to the course may be flown almost continuously so as to avoid the loss of time heretofore consumed in taxiing such planes up to a dock to take on or let off passengers.

Still a further advantage results in that the seaplane, if desired, may be lifted clear of the water so that work on the structure may be accomplished the same as in a dry dock.

Some changes may be made in the arrangement, construction and combination of the various parts of my improved device without departing from the spirit of my invention and it is may intention to cover by my claims such changes as may reasonably be included within the scope thereof.

I claim as my invention:

1. A seaplane landing device comprising a rectangular shaped float having a raised deck extending around the two sides and front thereof, the center portion and rear side of said barge having a normally submerged deck spaced a lesser distance from the bottom of the float, which submerged deck is inclined from its forward edge downwardly to position where it intersects the floor of the float at the rear end thereof, substantially vertical side walls connecting the raised deck with said submerged deck to form a water-tight compartment between the float and said decks, manually operable valves for permitting water to enter the space between said decks to thereby submerge said submerged deck, means for pumping water from said float whereby said submerged deck may be raised out of the water, a water-tight engine compartment sunk in the floor of each of the raised decks, each of said engine compartments having an engine therein adapted to actuate a propeller disposed at the rear of each raised-deck portion.

2. A seaplane landing device comprising a rectangular shaped float having a raised deck extending around the two sides and front thereof, the center portion and rear side of said barge having a normally submerged deck spaced a lesser distance from the bottom of the float, which submerged deck is inclined from its forward edge downwardly to position where it intersects the bottom of the float at the rear end thereof, vertical side walls connecting the raised deck with said submerged deck to form a water-tight compartment between the bottom of the float and said decks, a plurality of laterally extending beams spaced between the bottom of the barge and said submerged deck extending the full width of said float whereby loads impressed on said submerged deck will be transmitted to the bottom of said float, said laterally extending beams having a plurality of openings therethrough to allow the free circulation of water between said decks, a manually operable valve permitting water to enter the space between said decks to thereby submerge said submerged deck, means for pumping water from said float whereby said submerged deck may be raised out of the water, the inclination of said submerged deck relative to the bottom of said float allowing boats of small draft to bottom near the forward edge thereof while boats of deeper draft will bottom at positions nearer to the rear of the float.

WILLIAM B. MAYO.